United States Patent [19]
Lee

[11] 4,047,320
[45] Sept. 13, 1977

[54] BAIT DISPENSER
[76] Inventor: Marion D. Lee, Rte. 1, Box 174, Castor, La. 71016
[21] Appl. No.: 725,849
[22] Filed: Sept. 23, 1976
[51] Int. Cl.² .......................................... A01K 97/04
[52] U.S. Cl. ..................................................... 43/55
[58] Field of Search ................. 43/55, 4, 66; 221/310, 221/251, 264, 267

[56] References Cited
U.S. PATENT DOCUMENTS
| | | | |
|---|---|---|---|
| 731,335 | 6/1903 | Blanchet | 43/55 |
| 2,786,297 | 3/1957 | Simmons | 43/55 |
| 3,541,722 | 11/1970 | Garrison | 43/66 |

Primary Examiner—Warner H. Camp
Attorney, Agent, or Firm—John M. Harrison

[57] ABSTRACT

A bait dispenser for use by fishermen which includes a container for carrying live bait to be dispensed and a cooperating dispenser tube having a slot cut in the end thereof to form a pair of jaws with levers attached which levers facilitate a widening of the slot when depressed. The bait dispenser also includes a spring-loaded plunger on the dispenser tube which communicates with the interior of the tube to block the passage of live bait through the tube.

10 Claims, 10 Drawing Figures

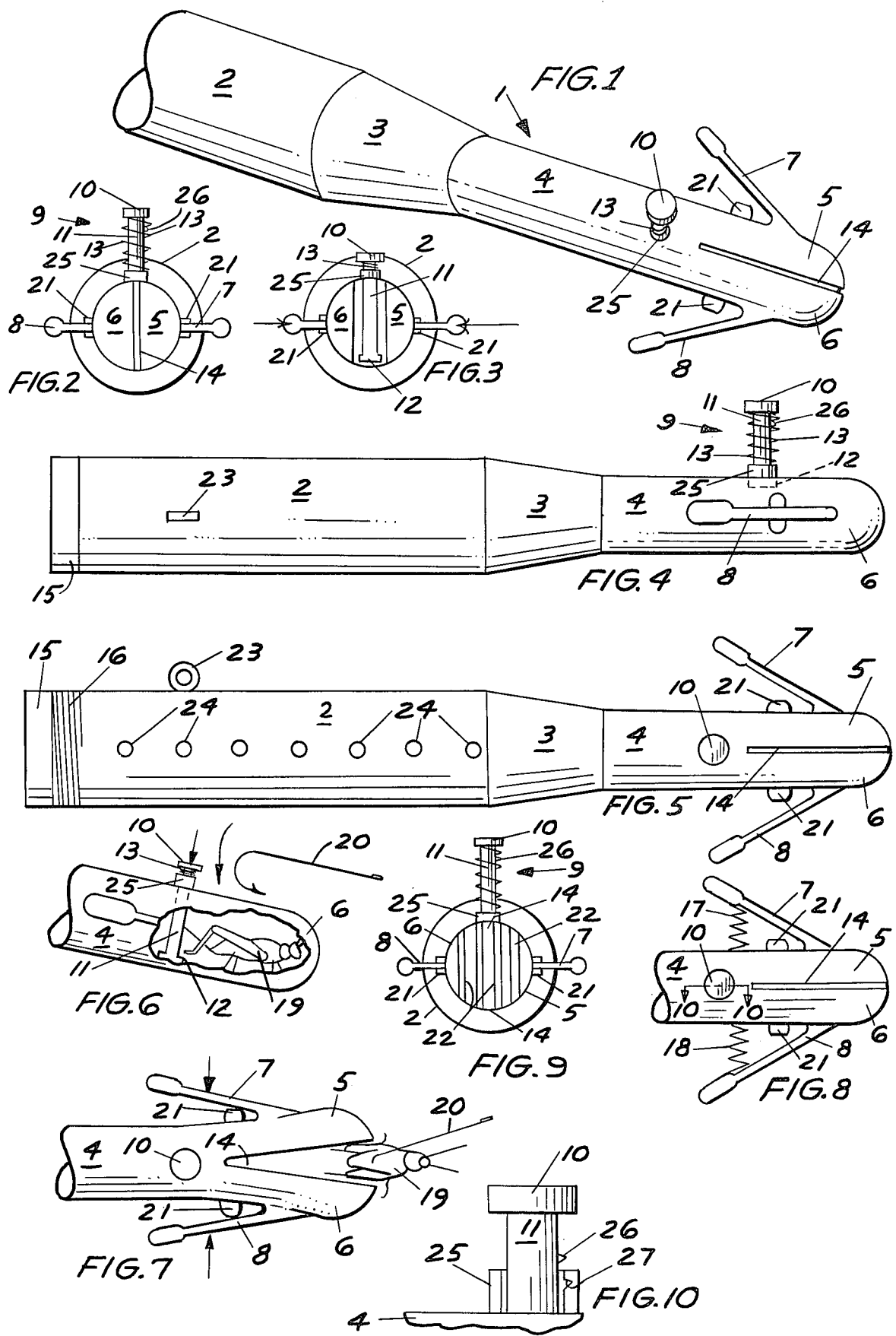

BAIT DISPENSER

BACKGROUND OF THE INVENTION

1. Field of the Invention

This invention relates to bait dispensers, and more particularly, to a bait dispenser which is formed in cooperation with a bait container and is capable of dispensing live bait through the end of the dispenser by manipulation of dispenser jaws. The dispenser may be used to contain and dispense substantially any variety of bait such as crickets, grasshoppers and the like, one at a time, without damaging the bait in the dispensing operation.

Fishing is a sport which is enjoyed by many persons who object to the actual handling of the bait necessary to attract and take the particular type of fish sought. For example, when fishing for bream, particularly in southern waters, a common bait is the cricket, which many people object to handling. Furthermore, such live bait as crickets and grasshoppers are quite easily dropped or lost when retrieved from conventional bait containers because of the natural propensity of the bait to move suddenly and elude the grasp of the handler. Additionally, such bait has a tendency to escape from conventional containers and closures when the lids are removed as the handler reaches for the bait.

2. Description of the Prior Art

Heretofore, bait containers and dispensing apparatus have been generally limited to wire cages or alternative containers such as the bait holder and dispenser disclosed in U.S. Pat. No. 2,948,986 to C. S. Williamson. This bait dispenser includes a box having sides constructed of wire mesh, with apertures around the periphery of the top, and pincher means fitted with a sponge or similar soft interior coating to grasp the bait and hold it in position for hooking.

Another prior art bait dispenser apparatus is the fishing bait container disclosed in U.S. Pat. No. 3,308,570 to E. Horton. The container disclosed in this patent is characterized by a tubular mesh container having a splined end member capped by a removable stopper, which end member is large enough to accommodate a cricket, grasshopper or other live bait. When the bait is located inside the splined member, a hook may be inserted in one of the parallel apertures formed in the splined member and thrust through the bait; the stopper may then be removed from the end of the splined member and the bait removed while embedded in the hook.

Yet another prior art bait dispenser is disclosed in U.S. Pat. No. 2,857,705 to J. Woodcock, which dispenser includes a cylindrically shaped container having a conical shaped member on one end with a slot and a hole on the dispensing end of the cone. The cone end also includes a clamp member mounted on the cone adjacent the hole to permit trapping a cricket, grasshopper or other bait as the bait attempts to exit the cone through the hole. The bait may then be hooked through the slot as it is held motionless by the clamp, thereby eliminating the necessity of handling the bait during the hooking operation.

Accordingly, it is an object of this invention to provide a bait dispenser which is capable of carrying and dispensing a quantity of live bait one at a time through a slotted dispensing mechanism located at one end of the container without the necessity of handling the bait.

Another object of the invention is to provide a new and improved bait dispenser which prevents the inadvertent loss of bait as bait is dispensed.

A still further object of the invention is to provide a bait dispenser which is capable of quickly and easily segregating a single bait entity and securely positioning the bait in a configuration to be easily pierced by a fish hook prior to dispensing the bait.

Yet another object of the invention is to provide a bait dispenser which is capable of holding individual items of bait substantially motionless and in a configuration to be easily hooked while the hook is inserted therein, and which subsequently permits dispensing of the bait without damaging the bait.

Yet another object of this invention is to provide a new and improved bait dispenser for dispensing live bait, which dispenser is capable of selectively dispensing a single bait entity in the discretion of the handler without the necessity of touching the bait during the dispensing operation and without releasing other bait in the dispensing process.

A still further object of the invention is to provide a new and improved bait dispenser which is characterized by a slotted, blunt dispensing end which defines a pair of dispensing jaws or mandibles, each having a manipulating lever for selectively widening or narrowing the slot, and further including a plunger member for blocking the passageway defined by the bait dispenser to insure capture and hooking of a single bait entity at a time.

Another object of the invention is to provide a bait dispenser which includes a closed, slotted end member having a pair of cooperating levers for manipulating the size of the slot and a plunger positioned adjacent and to the rear of the slot for blocking the exit of a bait entity to insure positive hooking of a single bait entity through the slot as the bait entity is confined in a limited space.

Another object of the invention is to provide a bait dispenser which is characterized by a container for carrying a supply of live bait and a dispensing means in cooperation with the container which includes a pair of mandibles or jaws separated and defined by a slot and having a plurality of vertically oriented, spaced and flexible bands across the ends of the jaws to permit controlled exit of bait from the container one at a time.

SUMMARY OF THE INVENTION

These and other embodiments of the invention are provided in a bait dispenser which includes a bait container for carrying a quantity of live bait; a cooperating bait dispenser tube having a closed end; a slot cut through the closed end of the dispenser tube to define a pair of adjacent dispenser jaws; a pair of jaw levers in cooperation with each of the dispenser jaws for manipulating the jaws to provide a selective widening or narrowing of the slot; and a plunger positioned to the rear of and adjacent the slot and communicating with the interior of the dispenser tube to prevent retreat of a bait entity toward the container after the bait entity has been positioned forward of the plunger and adjacent the slot and dispenser jaws in the dispenser tube.

BRIEF DESCRIPTION OF THE DRAWINGS

The invention will be better understood in view of the following description presented with reference to the accompanying drawing:

FIG. 1 of the drawing is a perspective view of the bait dispenser of this invention;

FIG. 2 is a front elevation of the bait dispenser illustrated in FIG. 1 with the dispenser jaws in closed configuration and the plunger extended;

FIG. 3 is a front elevation of the bait dispenser illustrated in FIG. 1 with the dispenser jaws in open configuration and the plunger depressed;

FIG. 4 is a right side elevation of the bait dispenser illustrated in FIG. 1;

FIG. 5 is a top elevation of the bait dispenser illustrated in FIG. 1 of the drawing;

FIG. 6 is a perspective view, partially in section, of the dispensing end of the bait dispenser illustrated in FIG. 1, further illustrating depression of the plunger and the position of the bait in the bait dispenser immediately prior to insertion of a hook in the bait;

FIG. 7 is a top elevation of the bait dispenser illustrated in FIG. 1 with the dispenser jaw levers depressed, and more particularly illustrating the removal of a hooked bait entity from the interior of the bait dispenser;

FIG. 8 is a top elevation of the front portion of the bait dispenser illustrated in FIG. 1 illustrating an adaptation of the dispenser jaw levers which includes a pair of springs to insure closing of the dispenser jaws after an insect or other bait entity is removed from the bait dispenser;

FIG. 9 is a front elevation of the bait dispenser of this invention illustrating an alternative dispenser jaw configuration; and FIG. 10 of the drawing is a sectional view along lines 10—10 of FIG. 8 of the drawing, illustrating the plunger and collar lock tab and slot of the bait dispenser illustrated in FIG. 1.

DESCRIPTION OF THE PREFERRED EMBODIMENTS

Referring now to FIGS. 1–3 of the drawing, the bait dispenser of this invention is generally illustrated by reference numeral 1 and includes container 2, which communicates with dispenser tube 4 by means of container neck 3. Dispenser tube 4 is split at the terminal end thereof by slot 14, which defines first dispenser jaw 5 and second dispenser jaw 6. First jaw lever 7 and second jaw lever 8 are carried by first dispenser jaw 5 and second dispenser jaw 6, respectively, as illustrated, to permit selective widening and narrowing of slot 14. Fulcrums 21 are provided on first dispenser jaw 5 and second dispenser jaw 6 to facilitate opening of first dispenser jaw 5 and second dispenser jaw 6, respectively, when first jaw lever 7 and second jaw lever 8 are depressed.

Plunger 9 is disposed in collar 25 and in tube dispenser 4 immediately behind slot 14, and includes plunger cap 10, plunger body 11, plunger foot 12, which serves to constrain plunger 9 to remain in the wall of dispenser tube 4 and in collar 25, and plunger spring 13, which effects a bias of plunger 9 in the extended position, as illustrated in FIGS. 1 and 2. FIG. 3 particularly illustrates the manipulation of first dispenser jaw 5 and second dispenser jaw 6 by pressure (indicated by the arrows) applied to first jaw lever 7 and second jaw lever 8 to cause a levering action on first dispenser jaw 5 and second dispenser jaw 6 and effect a widening of slot 14. Plunger 9 is illustrated in depressed configuration with plunger spring 13 compressed between plunger cap 10 and collar 25 which is formed on dispenser tube 4, and plunger body 11 communicates with the interior of dispenser tube 4 to block the passage of the bait either from container 2 to the dispensing end of tube dispenser 4 or from the dispensing end of the tube back into container 2.

Referring now to FIGS. 4 and 5 of the drawing, and FIG. 4 in particular, it will be appreciated that cap 15 may be unscrewed from threads 16 located on the end of container 2 opposite dispenser tube 4 in order to permit the loading or unloading of bait in the interior of container 2 and/or the cleaning of container 2. It will also be appreciated that alternative closure means can be used to gain access into the interior of container 2 according to the knowledge of those skilled in the art. For example, container 2 may be formed in the same diameter dimension as dispenser tube 4 and may be fitted with a plug which fits the end of container 2 in a relatively tight fit. It will also be appreciated that container 2 may be formed in substantially any shape or size, as desired, although it is preferred to shape the container from plastic, and to provide air holes 24, as illustrated in FIG. 5 of the drawing for ventilation. Eyelet 23 is also preferably provided on container 2 in order to accommodate a string or sling to support container 2 on the shoulders of the user in order to free the hands for operation of bait dispenser 1, as hereinafter described.

Referring now to FIGS. 6, 7 and 10 of the drawing and to FIG. 6 initially, the bait dispenser of this invention is used in the following manner. When live bait such as crickets or grasshoppers are placed in container 2 by unscrewing cap 15 from threads 16, the bait has a natural tendency to move toward the darkest area of bait dispenser 1. Accordingly, it is preferable to form container 2 of a clear plastic or wire material and dispenser tube 4 of a dark material. The bait will therefore have a natural tendency to move from the area of light in container 2 toward dispenser tube 4. Since a small amount of light comes into dispenser tube 4 through slot 14, the bait see this limited light as a means of escape, and move one by one into the area forward of plunger 9 and adjacent first dispenser jaw 5 and second dispenser jaw 6, as illustrated in the case of the cricket 19, shown in FIG. 6. The diameter of dispenser tube 4 adjacent first dispenser jaw 5 and second dispenser jaw 6 is not sufficiently large to accommodate more than one cricket or other bait at a time. Accordingly, at any given point in time there is generally a single cricket 19 or alternative bait entity in this compartment, which is defined by plunger 9, first dispenser jaw 5 and second dispenser jaw 6. When it is desired to remove the cricket from this area, plunger cap 10 is first depressed against the bias of plunger spring 13 to cause lock tab 26 to engage lock tab slot 27 as illustrated in FIG. 10, and place plunger body 11 in position blocking the interior of dispenser tube 4, as illustrated in FIG. 6. This compressive force is illustrated by the arrow shown in FIG. 6 adjacent plunger cap 10, and the depressed position of plunger 9 operates to prevent cricket 19 from moving rearwardly and retreating from the dispensing end of dispenser tube 4. Cricket 19 is thus effectively confined and substantially immobilized in this area of dispensing tube 4, and hook 20 can easily be inserted through slot 14 and into cricket 19 as illustrated. Referring now to FIG. 7 of the drawing, after cricket 19 is secured on hook 20 as illustrated, pressure is exerted on first jaw lever 7 and second jaw lever 8 across fulcrums 21 as indicated by the arrows, to cause first dispenser jaw 5 and second dispenser jaw 6 to move outwardly and slot 14 to expand, as illustrated. This expansion of slot 14 permits easy retrieval of cricket 19, which is impaled on hook 20, from the interior of dispenser tube 4 with no danger of inadvertently releasing additional bait from container 2 and no necessity of touching or handling cricket 19.

Referring now to FIG. 8 of the drawing, it will be appreciated that in an alternative embodiment of this invention, first jaw lever spring 17 and second jaw lever spring 18 are positioned between first jaw lever 7, second jaw lever 8, and dispenser tube 4, respectively, in order to bias first dispenser jaw 6 into position as illustrated, when pressure is removed from first jaw lever 7 and second jaw lever 8. Thus, first jaw lever spring 17 and second jaw lever spring 18 serve to help prevent inadvertent escape of bait from container 2 and dispenser tube 4 when plunger 9 is in extended position and bait dispenser 1 is not in use.

As heretofore discussed, it will be appreciated that bait dispenser 1 can be formed of metal with a wire mesh portion included to form container 2. Alternatively, and in a preferred embodiment of the invention, container 2 may be formed of an easily moldable plastic, and dispenser tube 4 is preferably formed of plastic with first dispenser jaw 5 and second dispenser jaw 6 formed of flexible plastic to permit easy manipulation by first jaw lever 7 and second jaw lever 8. First jaw lever 7 and second jaw lever 8 should be made of a relatively rigid material such as metal or plastic to facilitate easy manipulation of first dispenser jaw 5 and second dispenser jaw 6. Plunger 9 may be formed of metal or plastic, as desired, but is preferably also formed of an easily moldable plastic material. While plastic as a material of construction is generally preferred, it will be appreciated that alternative materials such as fiberglass may be used to construct container 2, while other flexible materials such as rubber and other materials known to those skilled in the art can be used to form first dispenser jaw 5 and second dispenser jaw 6.

Referring to FIG. 9 of the drawing, another alternative embodiment of the invention is illustrated, in which the extremities of first dispenser jaw 5 and second dispenser jaw 6 do not converge to form a blunt dispenser end. Rather, the jaws are sharply clipped and flexible bands 22 are provided to span the gap between the top and bottom of first dispenser jaw 5 and second dispenser jaw 6 and form a barrier to prevent the exiting of bait from dispenser tube 4. In operation, a single cricket 19 or other live bait entity is trapped in the compartment between flexible bands 22 and plunger body 11 when plunger 9 is depressed as heretofore described, and the squeezing of first jaw lever 7 and second jaw lever 8 causes flexible bands 22 to stretch and produce a gap large enough to extricate an impaled cricket 19 and the carrying hook 20 from within dispenser tube 4, as heretofore described. It will be recognized that flexible bands 22 can be positioned horizontally instead of vertically as illustrated in FIG. 9, to serve a similar function in providing better visibility at the dispensing end of dispenser tube 4. One end of each of the flexible bands 22 is attached to the dispenser jaws, respectively, while the other end operates to define slot 14. In this embodiment, flexible bands 22 must have enough structural integrity to resist exit of the bait, but sufficient flexibility to bend when first jaw lever 7 and second jaw lever 8 are depressed.

Referring again to FIG. 3 of the drawing, it will be appreciated that plunger foot 12 is formed on plunger body 11 to retain plunger 9 in slidable relationship in collar 25 and in the wall of dispenser tube 4 against the bias of plunger spring 13. Furthermore, plunger body 11 may be as wide as desired in order to effectively block the internal passageway formed by dispenser tube 4 to prevent movement of the bait to and from the dispensing end of dispenser tube 4 when plunger 9 is depressed.

Having described my invention with the particularity set forth above, what is claimed is:

1. A bait dispenser comprising:
   a. a dispensing tube, one end of which may be fitted to a container carrying live bait, and the opposite end of which is closed and which is characterized by a longitudinal slot defining a pair of jaws;
   b. lever means in cooperation with each of said jaws for manipulating said jaws and selectively expanding and contracting said slot; and
   c. a plunger positioned adjacent said slot transverse to the longitudinal axis of said dispensing tube, slidably carried by said dispensing tube, and extending into the interior of said dispensing tube when in depressed configuration.

2. The bait dispenser of claim 1 wherein said plunger is slidably positioned in the wall of said dispensing tube essentially parallel to a line connecting the ends of said slot through the interior of said dispensing tube, and is biased in upstanding position extending above said dispensing tube.

3. The bait dispenser of claim 1 further comprising a spring in cooperation with said plunger for biasing said plunger in extended and upstanding position in the wall of said dispensing tube and extending above said dispensing tube.

4. The bait dispenser of claim 1 further comprising a spring in cooperation with said plunger for biasing said plunger in extended and upstanding position in the wall of said dispensing tube and extending above said dispensing tube, and wherein said plunger is slidably positioned in the wall of said dispensing tube essentially parallel to a line connecting the ends of said slot through the interior of said dispensing tube.

5. The bait dispenser of claim 1 wherein said pair of jaws are open at said opposite end and further comprising at least two bands connecting the tops and bottoms of said jaws, respectively, to block the exit of said live bait from the interior of said container and said dispensing tube.

6. The bait dispenser of claim 1 further comprising biasing means in cooperation with said lever means and said dispensing tube for biasing said lever means in position to maintain contraction of said slot.

7. The bait dispenser of claim 1 wherein said pair of jaws are open at said opposite end and further comprising:
   a. at least two bands connecting the tops and bottoms of said jaws, respectively, to block the exit of said live bait from the interior of said container and said dispensing tube; and
   b. biasing means in cooperation with said lever means and said dispensing tube for biasing said lever means in position to maintain contraction of said slot.

8. The bait dispenser of claim 1 further comprising lock means in cooperation with the wall of said dispensing tube and said plunger for releasably securing said plunger in depressed configuration in said dispensing tube.

9. The bait dispenser of claim 1 wherein said jaws are soft and flexible and said lever means is a first jaw lever and a second jaw lever and a pair of fulcrums carried by said dispensing tube, and further comprising:
  a. a spring in cooperation with said plunger for biasing said plunger in extended and upstanding position in the wall of said dispensing tube and extending above said dispensing tube;
  b. a collar carried by said dispensing tube and slidably receiving said plunger; and
  c. lock means in cooperation with said collar and said plunger for releasably securing said plunger in depressed configuration in said dispensing tube against the bias of said spring.

10. The bait dispenser of claim 9 wherein said pair of jaws are open at said opposite end and further comprising at least two bands connecting the tops and bottoms of said jaws, respectively, to block the exit of said live bait from the interior of said container and said dispensing tube.

* * * * *